Patented Aug. 8, 1944

2,355,592

UNITED STATES PATENT OFFICE 2,355,592

SURFACE-ACTIVE AGENT

Milton Kosmin, Van Buren Township, Montgomery County, Ohio, assignor to Monsanto Chemical Company, a corporation of Delaware No Drawing. Application March 30, 1942, Serial No. 436,771

4 Claims. (Cl. 260—470)

The present invention relates to surface-active agents and is particularly concerned with the di-n-hexyl ester of sodium 4-sulfophthalic acid as a compound possessing a high degree of utility in the detergent, wetting and similar fields.

As is known, surface-active agents find wide application as detergents, foaming and wetting agents in a large number of industrial processes, especially in those relating to the treatment of textiles, leather and other fibrous materials. Among the compounds heretofore suggested for these and related purposes are sulfophthalic acid esters of aliphatic alcohols containing more than 2 carbon atoms, for example, the amyl, 2-ethyl butanol, 2-ethyl hexanol, cetyl and stearyl esters as illustrated in U. S. Patents 1,935,264 and 2,264,927. I have now found, as a result of comparative tests that the hitherto unknown, di-n-hexyl ester of sulfophthalic acid is of outstanding value, not only for the purpose of assisting in the wetting of textile materials, but also from a detersive standpoint. High wetting efficiency in neutral, acid and alkaline solutions, combined with high detergent efficiency in a single compound is strikingly rare.

I may prepare the sodium salt of the di-n-hexyl ester of sulfophthalic acid as follows: Into a 500 cc. flask equipped with a Stark and Dean moisture determination trap topped by a condenser I charge 22.8 grams (0.1 mol) of sulfophthalic anhydride—say the 4-sulfophthalic anhydride, 22.5 grams (0.22 mol) of n-hexanol and 50 cc. of benzene. I reflux the mixture until 2.7 cc. of water has been taken off, neutralize the resulting reaction mixture in water solution with caustic soda, and then drum-dry the neutralization mixture. In this manner I obtain 36.3 grams of a brownish, powdered product which comprises essentially the di-n-hexyl ester of sodium 4-sulfophthalic acid.

The compound thus obtained probably possesses the formula:

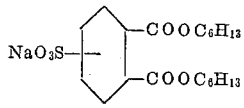

the ester group $C_6H_{13}$ constituting the n-hexyl group.

The sulfophthalic acid or anhydride may be prepared in known manner by the sulfonation, with sulfuric anhydride of phthalic anhydride at a temperature of 140° C. to 150° C. or even at higher temperatures such as 200 to 230° C.

In order to prepare the n-butyl-, isoamyl- and 2-ethylhexyl esters of sodium 4-sulfophthalic acid, I may employ the procedure described above except that instead of using n-hexanol as the alcoholic constituent of the reaction mass the corresponding n-butyl-, isoamyl- or 2-ethylhexyl alcohol, is employed.

The dried product produced as above described was evaluated as to wetting-out properties according to the Draves Test as described on pages 162 to 165 of the Year Book of the American Association of Textile Chemists and Colorists for 1935–1936. The following results were obtained:

*Wetting time, seconds*

| Ester of Na sulfophthalate tested | Percent concentration of ester tested | | | | | |
|---|---|---|---|---|---|---|
| | 0.5 | 0.25 | 0.125 | 0.0625 | 0.032 | 0.016 |
| Di-n-butyl (in $H_2O$) | 92 | +180 | | | | |
| Di-n-butyl (in 2% NaOH solution) | 53 | +180 | | | | |
| Di-n-butyl (in 2% NaOH solution) | +180 | | | | | |
| Di-isoamyl (in $H_2O$) | 11.2 | 88.4 | +180 | | | |
| Di-2-ethylhexyl (in $H_2O$ alone or in 2% $H_2SO_4$ or 2% NaOH solution) | +180 | | | | | |
| Di-n-hexyl (in $H_2O$) | (¹) | 3 | 6 | 18 | 72 | +180 |
| Di-n-hexyl (in 2% $H_2SO_4$ solution) | (¹) | 2 | 7 | 20 | 84 | +180 |
| Di-n-hexyl (in 2% NaOH solution) | 3 | 12 | +180 | | | |

¹ Instant.

From the above data it is apparent that the di-n-hexyl ester of sodium 4-sulfophthalic acid is superior to the other esters with respect to wetting-out properties in neutral, acid and alkaline solutions.

The detersive effectiveness of the above four alkyl esters of sodium sulfophthalic acid was compared with that of a commercially available synthetic detergent known to the trade as Gardinol WA. In order to make such a comparison I employed the following test:

White cotton fabric was thoroughly desized by washing successively in acid, alkaline and soap baths, the fabric being rinsed after each bath. The fabric so obtained was repeatedly immersed in a soil comprising 30 grams of oildag, 7.5 grams of Wesson oil and 1800 ml. of carbon tetrachloride, the unsoiled desized fabric being 100% white and the soiled fabric 100% black. Swatches of the soiled cloth measuring 5″ x 6″ were placed in separate jars containing 100 cc. of the solution under test together with 10 rubber balls. In all cases the concentration of the solution was 0.2% of detergent by weight. The jars were closed, clamped in a launderometer and agitated at a temperature of 140° F. for ten minutes. At the end of this time the launderometer was stopped, the fabric removed and rinsed twice with 100 cc. portions of water of the same hardness used for the washing. The water used for the washing and the rinsing contained hardness to the extent of 300 parts per million, 60% of which was calcium, the balance being magnesium hardness. Four duplicate test washes were made for each ester investigated.

Upon drying the test swatches, the degree of soil removal was measured by means of the Lange photoelectric photometer. The average of the four test washes for each ester investigated compares as follows with the similarly obtained result for Gardinol WA, the per cent efficiency of Gardinol WA being expressed as 100:

| | Per cent |
|---|---|
| Di-n-butyl ester | 27 |
| Di-isoamyl ester | 45.7 |
| Di-n-hexyl ester | 102 |
| Di-2-ethylhexyl ester | 35 |
| Gardinol WA | 100 |

From the above data it is apparent that the di-n-hexyl ester of sodium 4-sulfophthalic acid is far superior in detersive properties to the other esters of sodium 4-sulfophthalic acid investigated.

The di-n-hexyl ester of 4-sodium sulfophthalic acid may be used as a textile adjuvant in the dyebath, for making dressings and finishings containing magnesium sulfate, for enhancing the tendency of carbonizing and mercerizing liquors to wet the fabric and for like purposes. The di-n-hexyl ester of sodium 4-sulfophthalic acid is also valuable in the preparation of aqueous solutions, emulsions or suspensions of compounds which are in themselves sparingly soluble, for instance dyestuffs, hydrocarbons and their substitution products, higher alcohols or the like.

The present compounds in the form of their sodium or potassium salts may be employed as a wetting agent in the mercerizing bath. Mercerizing solutions are normally strong caustic soda solutions, say in the neighborhood of 20% to 30% NaOH concentration. Employed as a mercerizing wetting agent, in a 20% NaOH solution, my compounds showed the following rates of wetting at 20° C:

| Ester of Na-sulfophthalate tested | Time of wetting cotton in 20% NaOH solutions, percent concentration of ester tested | | | |
|---|---|---|---|---|
| | 1.0% | 0.5% | 0.25% | 0.125% |
| Di-n-butyl | +3 min | | | |
| Di-2-ethylhexyl | +3 min | | | |
| Di-n-hexyl | Instant | Instant | 1.3 sec | 4.7 sec |

Whereas for reasons of economy I prefer to employ the di-n-hexyl ester of sodium 4-sulfophthalic acid, I likewise obtain excellent wetting-out and detersive action with the di-n-hexyl esters of other alkali metal 4-sulfophthalic acids, for example, the di-n-hexyl ester of potassium 4-sulfophthalic acid or with the corresponding ammonium salt.

What I claim is:

1. An ester of sodium sulfophthalic acid having the formula:

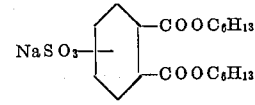

the ester group, —$C_6H_{13}$, constituting the n-hexyl group.

2. Di-n-hexyl alkali metal sulfophthalates.
3. Di-n-hexyl-4-sodium sulfophthalate.
4. Di-n-hexyl-4-potassium sulfophthalate.

MILTON KOSMIN.